Aug. 25, 1959

S. W. SMALL ET AL 2,901,002

VALVE MECHANISM

Filed April 10, 1956

INVENTOR
SOLLIE W. SMALL
DAVID HERMAN
BY
William R. Lieberman
ATTORNEY

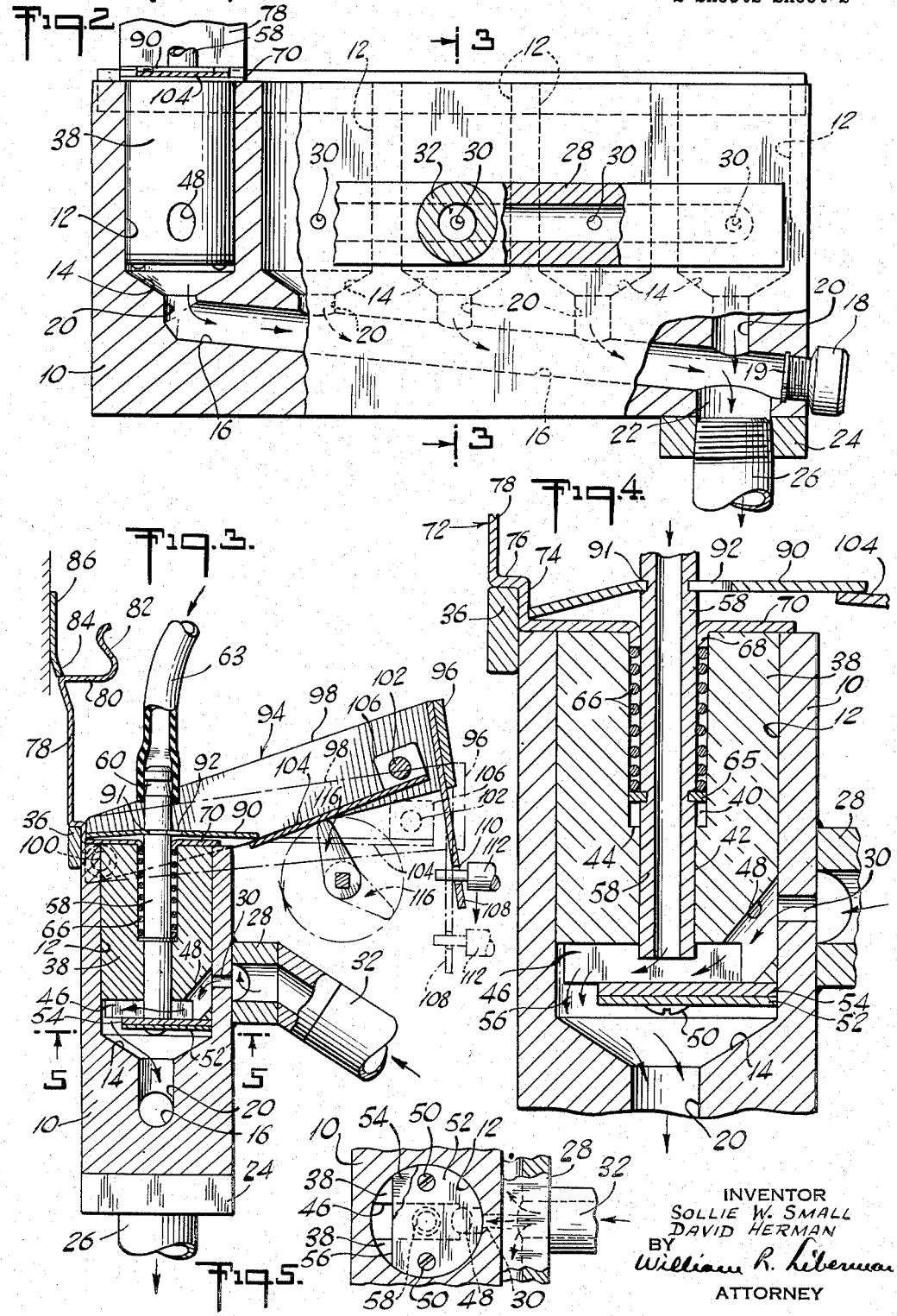

United States Patent Office 2,901,002
Patented Aug. 25, 1959

2,901,002

VALVE MECHANISM

Sollie W. Small and David Herman, Newark, N.J., assignors to Coffee-Mat Corporation, Elizabeth, N.J., a corporation of New Jersey Application April 10, 1956, Serial No. 577,295

13 Claims. (Cl. 137—635)

The present invention relates generally to improvements in liquid dispensing devices, and it relates more particularly to an improved multiple valve structure for the selective metering and dispensing of a plurality of liquids.

In coin-operated machines employed in the dispensing of drinks, such as coffee, hot chocolate, soft drinks, carbonated beverages and the like, it is conventional to provide the purchaser with a choice of drink as well as a choice of the various ingredients. The base or vehicle is usually hot or cold water to which is added one or more selected syrups. Since water is readily available in unlimited quantities and the syrups are relatively concentrated, a plurality of small containers can hold enough syrup for a large number of drinks. An example of a machine of this type is described and illustrated in the copending patent application Serial No. 249,452, filed October 3, 1951, in the names of Sollie W. Small and David Herman, said application having matured into Patent No. 2,755,006.

An essential mechanism in machines of the above type is the syrup metering system. It is important that the metering mechanism be rugged and simple and yet provide complete versatility and flexibility. It should be capable of metering one or more liquids concurrently and should be substantially clog-proof even when such liquids are highly viscous and of a crystallizing nature. Another important requirement of the mechanism is that it be simple to clean and service and attach and detach to the various liquid reservoirs. While the metering mechanism disclosed in the above-identified patent application is highly satisfactory in some of its features, it may be improved.

It is thus a principal object of the present invention to provide an improved liquid dispensing device.

Another object of the present invention is to provide an improved multiple valve structure for the selective metering and dispensing of a plurality of liquids.

Still another object of the present invention is to provide an improved selective multi-valved liquid metering mechanism for use in automatic, semi-automatic and hand operated drink dispensing machines.

A further object of the present invention is to provide an improved selective multi-valved liquid metering mechanism characterized by the ease and simplicity of connecting it to sources of fluid and in replenishing the fluid sources.

Still a further object of the present invention is to provide an improved selective multi-valved liquid metering mechanism characterized by its simplicity, ruggedness and fault-proof operation.

Another object of the present invention is to provide an improved selective multi-valved liquid metering mechanism which is simple to service and maintain.

The above and further objects of the present invention will become apparent from a reading of the following description taken in conjunction with the accompanying drawings, wherein Figure 1 is a top perspective view, partially broken away and partially disassembled, of an improved valve mechanism embodying the present invention;

Figure 2 is a front elevational view, partially broken away and partially in section, of the valve casing and valve assembly per se;

Figure 3 is a sectional view taken along line 3—3 in Figure 2, also illustrating the valve selector and lifting mechanism shown in full line in operative position and in broken line in inoperative position;

Figure 4 is an enlarged detail transverse sectional view, partially broken away, illustrating the valve structure; and Figure 5 is a sectional view taken along line 5—5 in Figure 3.

Figure 1:
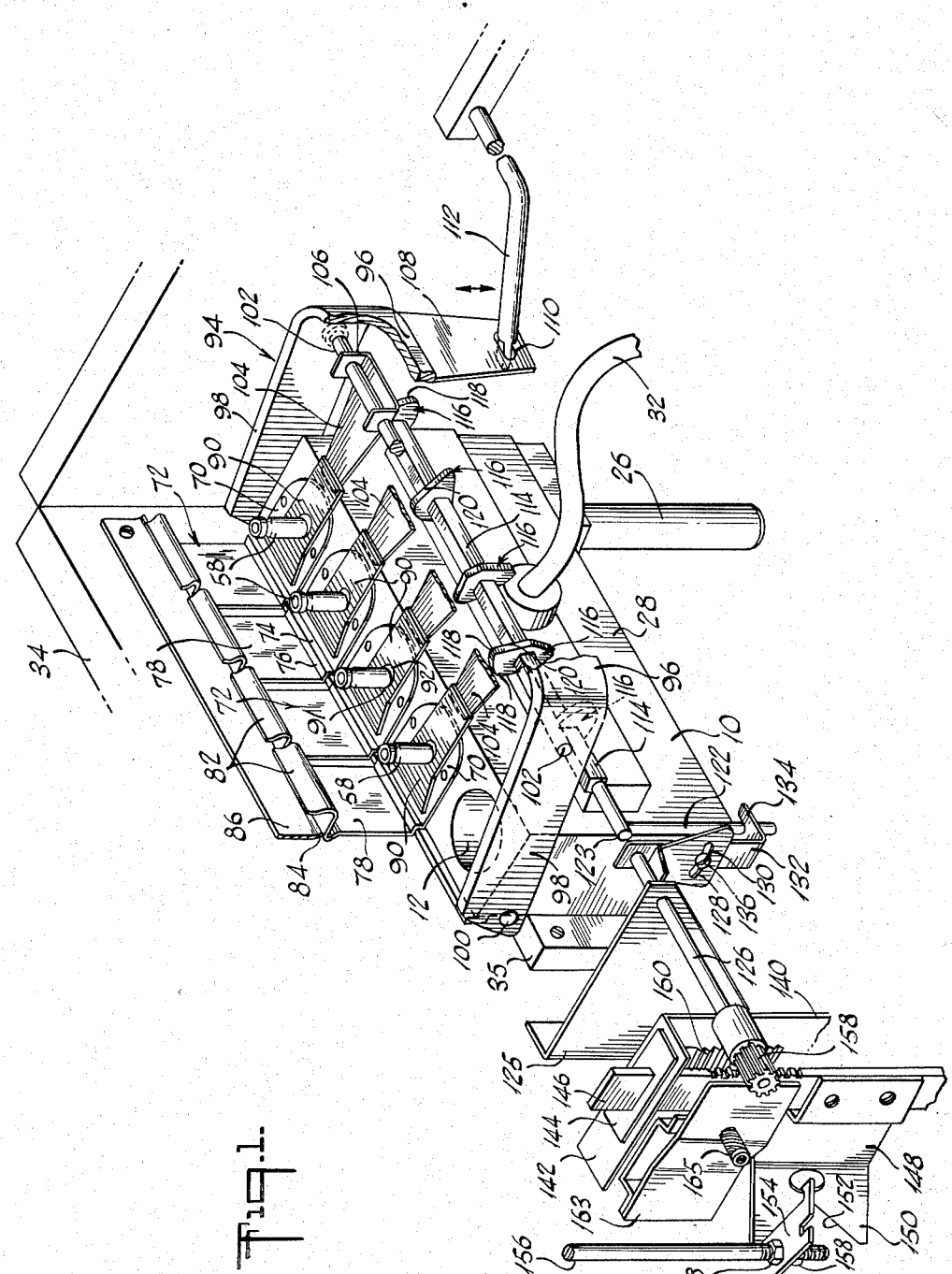

In a broad sense, the present invention contemplates the provision of an improved valve mechanism comprising a casing having a plurality of cavities formed therein, outlet and inlet conduits communicating with said cavities, a plug member removably located in each of said cavities, each of said plug members having a longitudinal bore formed therein, a tubular valve member slidably engaging each of said bores and having an inner end directed into said corresponding cavity, a valve seat confronting said inner end of each of said tubular valve members, spring means normally urging said valve member inner ends into closing engagement with said valve seats and means for selectively raising said tubular members to effect the opening of the corresponding valves.

Reference is now made to the drawings, which illustrate a preferred embodiment of the present invention, wherein the numeral 10 designates a valve casing of substantially rectangular configuration and formed of plastic, metal or other suitable material. Formed in the upper portion of the valve casing 10 are a plurality of spaced cylindrical cavities 12 of circular cross-section each having a frusto conical base 14. An inclined longitudinally extending bore 16 is formed in the body member 10 and extends through a side wall thereof, the end of the bore 16 being closed by a removable plug 18 provided with a suitable disc shaped gasket 19. Each of the cavities 12 communicate with bore 16 by way of the vertical bores 20 so that fluid falling into the bases 14 of the cavities 12 will discharge into the inclined bore 16 and will travel down the said inclined bore.

Directly below an end cavity 12 and adjacent the lower end of the bore 16, there is formed an opening 22 in the bottom of the casing 10 communicating with the bore 16. An internally threaded reinforcing collar 24, secured to the underface of the casing 10 along the border of the opening 22, engages a depending threaded pipe 26 which defines a discharge tube. A longitudinally extending distributing manifold 28 is disposed along the front face of the casing 10 above the level of the cavity bottoms 14 and communicates with the individual cavities 12 by way of openings 30 formed in the casing front wall. A centrally located feed pipe 32 is removably secured in any well known manner to the distributing manifold 28 and communicates with the interior thereof. While only one feed pipe 32 has been illustrated in communication with the manifold 28, two or more of such pipes may be similarly provided to permit the introduction thereby of two or more liquids either alternatively or concurrently.

The casing 10, as well as the equipment associated therewith, is removably positioned on a wall of a heat-insulated cabinet 34 by means of suitable brackets 35 carried by the walls of the cabinet 34. A bar 36 of rectangular cross-section, whose purpose will be hereinafter set forth, is located along the upper portion of the rear wall of the casing 10 and projects above the upper edge thereof.

Located in each of the cavities 12 is a cylindrical valve body member 38 which is in relatively loose and slidable engagement with the interior face of the cavity 12 and extends from a point above the perimeter of the frusto-conical base 14 to the upper face of the casing 10. Upper and lower communicating axial bores, 40 and 42 respectively, are formed in the body member 38, the upper bore 40 being of slightly larger transverse cross-section than the lower bore 42 and being separated therefrom by a horizontal annular shoulder 44. A channel-shaped transversely extending groove 46 is formed in the underface of the valve body member 38 and extends from the rear face of the body member 38 to a point between the longitudinal axis of the body member 38 and the front face thereof. An inclined bore 48 affords communication between the groove 46 and the distributing manifold 28 by way of the openings 30. Removably affixed to the underface of the valve body member 38, by means of screws 50, is a lower metal plate 52 and an upper sheet 54 superimposed upon the lower plate 52 and preferably formed of a resilient material to define a valve seat. The plate 52 and sheet 54 are substantially disc-shaped having their rear portions cut away, as at 56, to afford communication between the groove 46 and the discharge sections of the cavities 12.

A tubular member 58 is slidably mounted in the bores 40 and 42 and has an outer diameter substantially equal to the diameter of the lower bore 42 and extends above the upper face of the valve body member 38 and below the top wall of the groove 46. The upper end of the valve tubular member 58 is suitably shaped, as at 60, to facilitate the removable attachment of a flexible tube 63 which connects the valve member to a corresponding liquid source. The tubular member 58 has an annular groove formed in its outer wall above the valve body member shoulder 44 and engages a collar 65 having an outer diameter substantially equal to the diameter of the upper axial bore 40. The valve tube 58 is normally urged downwardly so that its lower end is in liquid-tight engagement with the valve seat 54, by means of a helical compression spring 66 nested in the upper bore 40 between the confronting faces of the bore 40 and the tube 58. The lower end of the helical spring 66 bears against the upper face of the collar 65 and the upper end of the helical spring 66 bears against the downwardly directed face of a tubular member 68, which slidably registers with the tube 58 and depends from the horizontal wall 70 of a valve-locking member 72.

The valve-locking member 72 is formed of a resilient sheet material, the horizontal wall 70 thereof being secured to the upper face of the valve body member 38 and extending beyond the peripheral edges thereof. The wall 70 projects rearwardly to the rear face of the valve casing 10 and is there surmounted by a laterally extending angle member having a vertical leg 74 and a horizontal leg 76, the latter carrying an upwardly directed resilient latching plate 78. The upper end of the latching plate 78 is inclined rearwardly and carries a forwardly directed horizontal leg 80 terminating in an upwardly directed S-shaped finger-piece 82. When the valve body member 38 is assembled in the corresponding cavity 12, the legs 74 and 76 of the latching member 72 abut the corresponding faces of the bar 36 and the leg 80 engages the underface of a forwardly, downwardly projecting arm 84 depending from a latching bar 86 mounted on a wall of the cabinet 34. Thus, in normally latched condition, the valve body member 38 is locked in position within the cavity 12 by means of the latching member 72. By springing the latching member arm 78 forward, by means of the finger-piece 83, out of engagement with the latching bar 86, the entire valve body assembly may be removed from the cavity 12 for servicing, cleaning or replacement.

In order to effect the opening of selected valves, each of the valve members 58 is provided with a valve-lifting lever 90, which is provided with a keyhole shaped opening 92 engaging a peripheral groove 91 formed in the wall of the valve member 58 slightly above the upper face of the plate 70 when the valve member 58 is in closed position. The opening 92 has an enlarged portion permitting the sliding of the plate on the valve member 58 and a reduced portion permitting the engagement of the groove 91 by the corresponding edge of the opening 92. The valve-lifting lever 90 extends transversely from a point forward of the rear edge of the valve casing to a point forward of the forward edge of the valve casing 10 so as to overhang the latter.

A U-shaped yoke member 94 includes a cross arm 96 disposed forwardly of the valve casing 10 and a pair of rearwardly directed legs 98 which are rotatably pivoted to the side walls of the valve casing 10 by means of suitable pins 100. An axle 102 is carried by and between the yoke legs 98 and is spaced immediately rearwardly and parallel to the yoke cross arm 96. Rotatably carried by the axle 102 are a plurality of valve-lifting fingers 104 provided at their forward ends with upwardly extending bracket members 106 which rotatably engage the axle 102. The fingers 104 are rearwardly tapered and terminate at points below the corresponding valve-lifting levers 90. It should be noted that the bar 36 maintains the levers 90 in proper disposition and alignment relative to the fingers 104. A resilient arm 108 depends from the yoke cross arm 96 and is provided with a laterally extending slot 110 which is engaged by a vertically moving actuating member 112 motivated in any well known manner. Disengagement of the arms 108 and 112 may be effected by springing the arm 108 rearwardly to permit the removal of the valve system.

Disposed directly below the yoke member 94 and forward of the axle 102 is a selector shaft 114 of substantially square transverse cross-section and carrying a plurality of regularly spaced fulcrum cams 116 disposed below the corresponding valve-raising fingers 104. Each of the cams 116 is provided with one or more circumferentially spaced raised sections 118 and depressed sections 120. The cams 116 are so shaped and the fingers 104 so disposed that when the shaft 114 is rotated to a selected position one or more of the cams will have selected raised portions in registry with corresponding fingers 104 so that upon depression of the free end of the yoke member 94 by the actuating arm 112, the free ends of the fingers 104 will swing upwardly about the respective fulcrum points to raise the levers 70 and the valve members 58, thus opening the respective valves. It should be noted that the shaft 114 is rotatable between selective positions as will be hereinafter set forth to bring predetermined raised portions and depressed portions of the cams 116 in registry with the respective fingers 114 to open only the corresponding valves. The shaft 114 is suitably rotatably supported and is provided at one end thereof with a depending arm 122 connected to the shaft by a horizontal arm 123.

The mechanism for rotating the cam-carrying shaft 114 to selected positions includes a bracket 125 rotatably supporting a longitudinally extending shaft 126, the forward end of which supports a depending bracket 128 having an arcuate slot 130 formed therein, the center of curvature of the slot 130 being the longitudinal axis of the shaft 126. Forward of the bracket 128 is a depending arm 132 having its upper end rotatably engaging the forward end of the shaft 126 and terminating at its lower end with a forwardly directed yoke member 134 which separably straddles the arm 122. A locking screw 136 extends through the arcuate slot 130 and engages a corresponding tapped hole formed in the arm 132 to thereby permit the angular adjustment of the cam-carrying shaft 114 relative to the shaft 116, whereby the fulcrum points of the cams 116 are in their uppermost position when the shaft 126 is in its stepped or increment rest position.

Spaced outwardly from the bracket 125 is another bracket 140 having a horizontal upper shelf 142 which carries a slotted guide or backlash plate 144. A rack 146 engages the slot in the plate 144 and is vertically slidable therein and carries at its lower end a rearwardly directed connector plate 148. The connector plate 148 terminates in a yoke member 150 having inclined confronting edges 152 on the side legs thereof to facilitate engagement with a tongue 154 carried at the lower end of a vertically movable rod 156. The tongue 154 is vertically adjustable on the rod 156 by means of a pair of nuts 158 carried on the lower threaded end of the rod 156 and abutting opposite faces of the tongue 154. The vertical movement of the rod 156 is controlled from the front face of the dispensing machine by any suitable mechanism.

A pinion 158 is mounted on the trailing end of the shaft 126 and engages the rack 146 to effect a mechanical coupling between the control rod 156 and the cam-carrying shaft 114. In order to insure that the cam shaft 114 and the cams 116 may be moved only in fixed increments to bring the selected raised portions of the cams 116 into the desired position, the bracket 140 has regular serrations 160 formed on its inner vertical face. An arm 163 is carried on the rack 146 and extends rearwardly thereof. Mounted on the arm 163 is a spring-loaded detent device 165 of any well known construction, the free end of which engages the serrated surface 160 to urge the rack 146 into regularly spaced rest positions. Should the selector mechanism be positioned between selected positions, cooperation between the detent mechanism 165 and the serrated surface 160 will cause the rack to move to a fixed position and carry the cam shaft 114 to its respective selected position.

Considering now the operation of the valve mechanism illustrated and described above, the operator selects the desired ingredients of his drink by raising or lowering the rod 156 to his respective selection by means of the associated device located on the outer face of the dispensing machine. He thereby actuates the selector mechanism to rotate the cam shaft 114 so that the raised portions 118 of the cams 116 are in their topmost position below the respective fingers 104 associated with the selected liquid valves, whereas the depressed portions 120 of the cams 116 register with the fingers 104 of the non-selected liquid valves. In the event that the selector control is turned to a position between designated positions, the detent mechanism 165 will urge the rack 146 and the selector mechanism to an increment rest position.

A coin is then inserted into the machine and by suitable motivating means the arm 112 depresses the free end of the yoke member 94 for a predetermined time interval and a measured quantity of liquid is delivered to the distributing manifold 28 by way of the feed pipe 32. The yoke 94 is depressed by the arm 112 for a predetermined interval in accordance with the quantity of liquid to be admixed with the water. Upon depression of the yoke 94, fingers 104 register with raised portions 118 of the cams 116 and their forward ends are elevated thus raising the free ends of the valve-lifting levers 90, raising the tubular valve members 58 and effecting an opening between the lower ends of the corresponding valve members 58 and the valve seats 54. Liquids will flow from the corresponding reservoirs through the valve members 58 along the valve seats 54 and into the bottoms of the respective cavities 12. The water, which is fed through the distributing manifold 28, will pass through the respective openings 30 and wash over the valve seats 54 mixing with the metered injected fluids. The various metered liquids and water will enter the inclined bore 16, where they will be thoroughly admixed and discharged into a waiting receptacle by way of the nozzle 26.

In the event it is desired to replace any of the individual valves, the respective latching arm 78 is sprung forward out of engagement with the latching bar 86 and the individual valve assembly is then removed from the corresponding cavity 12. Should it be desired to remove the entire valve assembly, including the valve casing 10 and the associated yoke 98 and cam-carrying shaft 114, the various latching arms 78 are sprung forward out of engagement with the latching bar 86 and the valves removed from their corresponding cavities 12. The feed pipe 32 is then disengaged from the distributing manifold 28 and the shaft 114 is rotated so that the depending arm 122 assumes a vertical position, as illustrated in Figure 1 of the drawing, to permit disengagement from the yoke member 134 upon raising of the valve body member 10. The resilient arm 108 is then sprung rearwardly out of engagement with the actuating arm 112 and the entire assembly slid upwardly and removed. The cam shaft arm 122 will merely move out of registry with the yoke 134 during the upward movement of the valve assembly. In reinserting either the individual valve or the entire assembly, the above procedure is merely reversed.

While there has been described and illustrated a preferred embodiment of the present invention, it is apparent that numerous alterations and omissions may be made without departing from the spirit thereof.

We claim:

1. An improved valve device comprising a casing having a plurality of cavities formed therein, main outlet and inlet conduits communicating with said cavities, a plug member removably located in each of said cavities, the assembly of said plug member in said respective cavity having a passageway formed therein between said outlet and inlet conduits, each of said plug members having a longitudinal bore formed therein, a tubular valve member slidably engaging each of said bores and having an inner end directed into said corresponding passageway and an outer end connected to a source of liquid, a valve seat confronting said inner end of each of said tubular valve members, spring means normally urging said valve member inner ends into closing engagement with said valve seats and means for selectively raising said tubular members to effect the opening of the corresponding valves.

2. An improved valve device in accordance with claim 1, wherein said valve seats are secured to said respective plug members.

3. An improved valve device in accordance with claim 1, wherein each of said plug members has a radially extending groove formed in the bottom face thereof, the lower ends of said corresponding tubular valve members projecting into said radial groove.

4. An improved valve device in accordance with claim 1, including means for releasably locking each of said plugs in said corresponding cavities.

5. An improved valve device in accordance with claim 4, wherein said locking means includes an apertured plate registering with said tubular valve member and disposed on the upper face of said plug, said plate extending beyond the edges of said plug member and having an upwardly directed resilient leg projecting from an edge thereof, and detent means releasably engaging said resilient leg.

6. An improved valve device in accordance with claim 1, wherein said longitudinal bore formed in said plug member has an upper portion of enlarged transverse cross-section and a lower portion of reduced transverse cross-section and including a collar member carried by said tubular valve member and disposed in said bore upper portion, said spring means being defined by a helical compression spring bearing against the upper face of said collar and against a stop member located above said collar.

7. An improved valve device in accordance with claim 1, wherein said means for selectively raising said tubular members includes valve-lifting levers engaging corresponding tubular members, a plurality of fingers having end portions thereof engaging the ends of corresponding valve-lifting levers and means for selectively raising the lever engaging end of said fingers whereby to effect the opening of said selected valves.

8. An improved valve device in accordance with claim 1, wherein said valve-raising means includes a plurality of levers engaging said tubular valve members, a plurality of fingers adapted to actuate corresponding valve tubular members through said levers, a movable support member for rotatably carrying said fingers, a cam shaft located adjacent to said fingers between said movable support and said tubular valve members, a plurality of cams carried by said cam shaft and registering with each of said fingers, said cams having raised and depressed portions and means for rotating said cam shaft whereby to bring selective raised and depressed portions of said cams into alignment with said fingers and means for moving said support member whereby to effect rotation of said fingers registering with the raised portions of said cams to raise the corresponding tubular valve members.

9. An improved valve device in accordance with claim 8, including means for rotating said cam shaft preselected increments.

10. An improved valve device in accordance with claim 8, wherein said support member moving means includes a yoke member having a cross arm and projecting legs, the ends of said legs being pivoted to said valve casing, said finger support being carried by and between said yoke legs adjacent to said yoke cross arm.

11. An improved multiple valve device comprising a plurality of valves, each having a valve opening element, a finger member associated with each of said valve opening elements, each of said finger members having a first end positioned to engage a corresponding valve opening element and a second end remote from said first end, a cam disposed between the opposite ends of each of said finger members and having raised portions selectively movable into registry with said finger members at a point intermediate the ends thereof, and means engaging the second ends of said finger members to move said second ends of said finger members and rock the first ends of only those finger members registering with raised portions of said cams about said raised portions whereby to actuate said corresponding valve opening elements.

12. An improved valve mechanism in accordance with claim 11, including a rotatable shaft carrying said cams.

13. An improved valve mechanism in accordance with claim 12, including means for rotating said cam-carrying shaft fixed increments.

References Cited in the file of this patent
UNITED STATES PATENTS

| | | |
|---|---|---|
| 428,199 | Birkery | May 20, 1890 |
| 1,447,457 | Yeiser | Mar. 6, 1923 |
| 2,196,430 | Sprenger | Apr. 9, 1940 |
| 2,677,392 | Huppertz | May 4, 1954 |
| 2,775,261 | Ziller | Dec. 25, 1956 |